Figure 1:
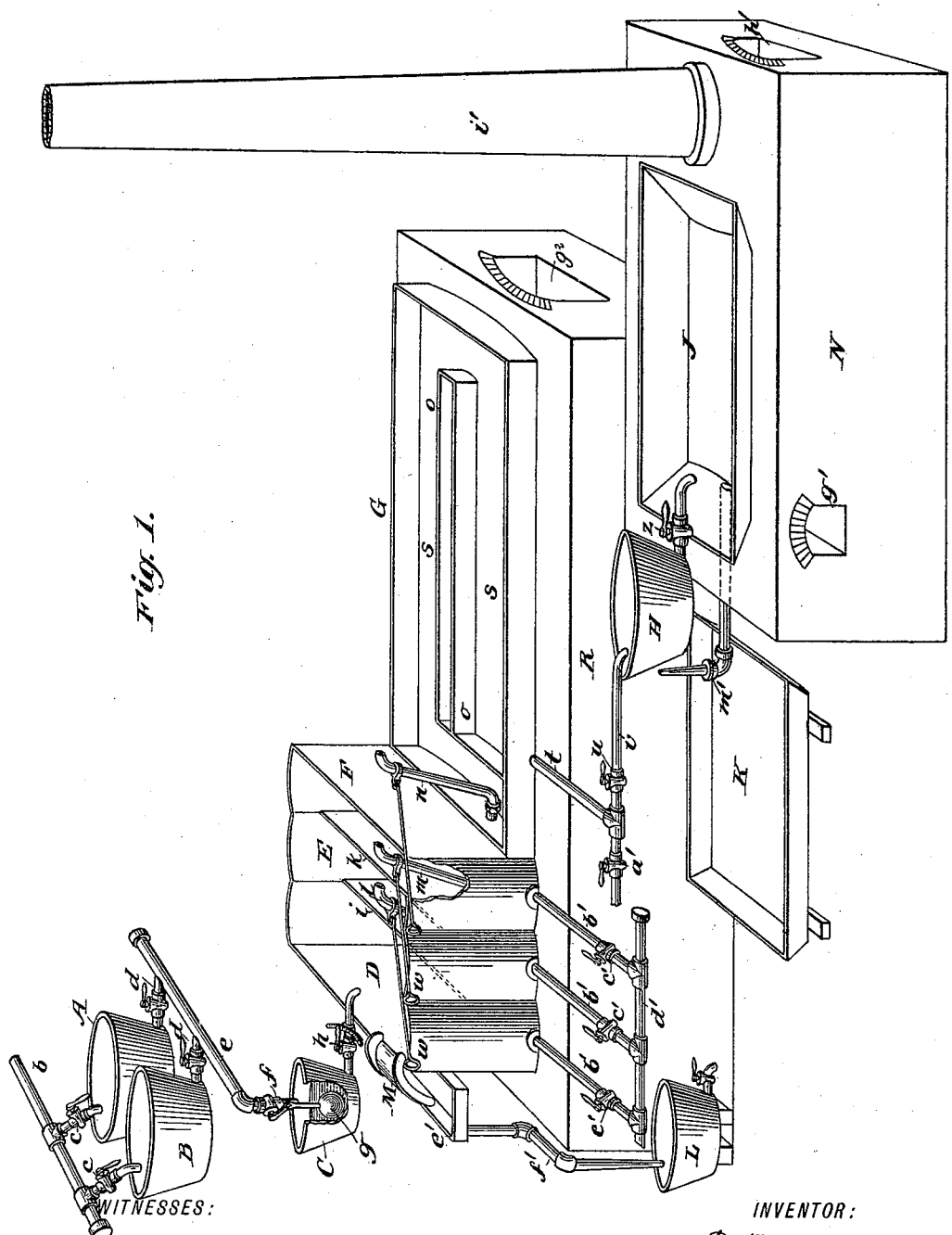

(No Model.) 2 Sheets—Sheet 1.

R. F. CORDERO.
APPARATUS FOR DEFECATING AND EVAPORATING SACCHARINE JUICES.

No. 455,308. Patented July 7, 1891.

WITNESSES:
J. A. C. Criswell
C. Sedgwick

INVENTOR:
R. F. Cordero
BY Munn & Co.
ATTORNEYS

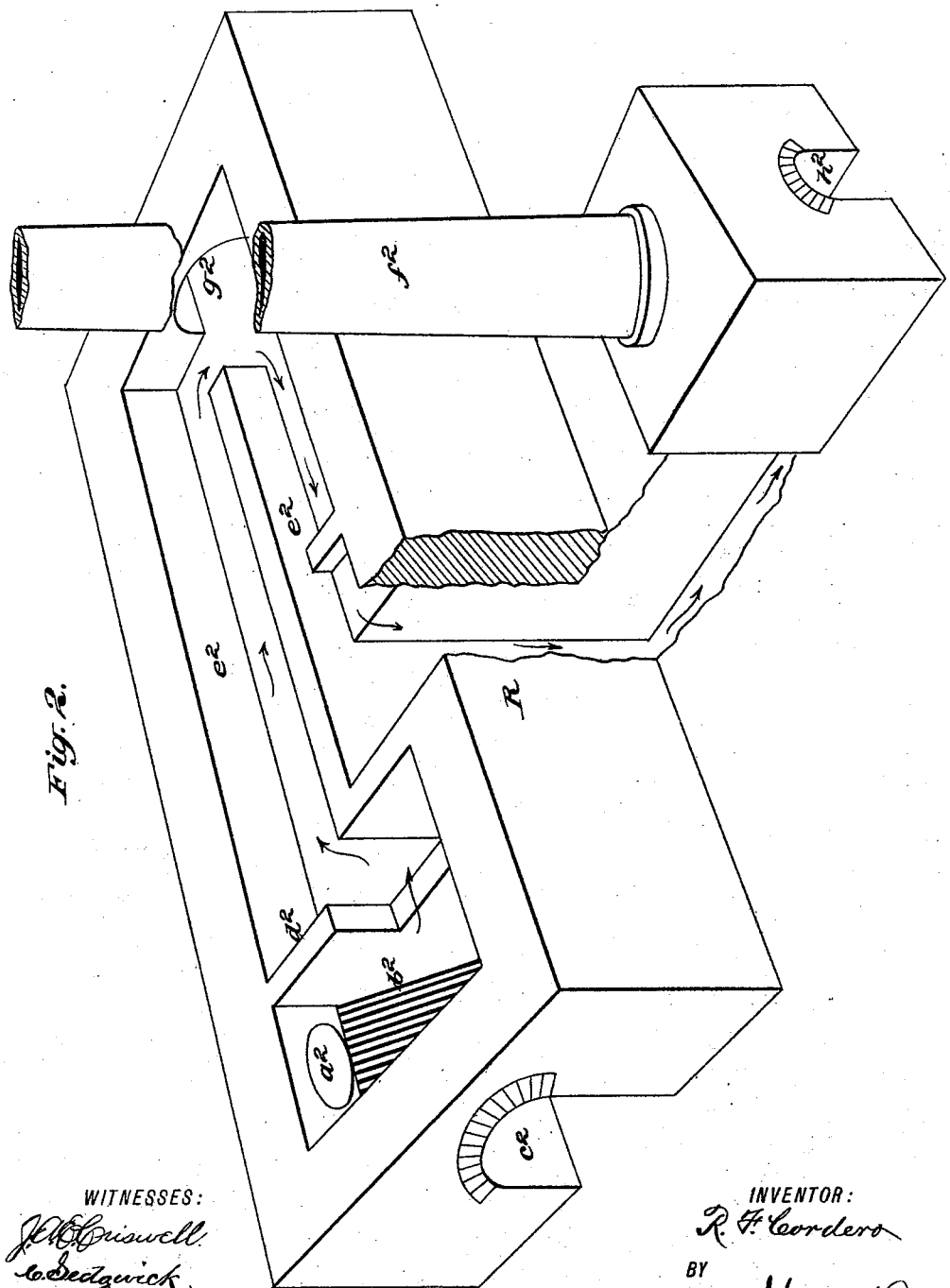

UNITED STATES PATENT OFFICE.

RAMON FEBRES CORDERO, OF RUBIO, VENEZUELA.

APPARATUS FOR DEFECATING AND EVAPORATING SACCHARINE JUICES.

SPECIFICATION forming part of Letters Patent No. 455,308, dated July 7, 1891.

Application filed August 2, 1890. Serial No. 360,735. (No model.)

*To all whom it may concern:*

Be it known that I, RAMON FEBRES CORDERO, of Rubio, Section of Tachira, State of Los Andes, United States of Venezuela, South America, have invented a new and useful Improvement in Apparatus for Defecating and Evaporating Saccharine Juices, of which the following is a full, clear, and exact description.

The invention consists in the construction and arrangement of parts hereinafter described and claimed.

Reference is to be had to the accompanying drawings, forming a part of this specification, in which similar letters of reference indicate corresponding parts in both the figures.

Figure 1 represents a view in perspective of my improved apparatus, and Fig. 2 a further broken perspective view of a furnace used in the apparatus.

A and B indicate receptacles into which the saccharine juices as they come from the mill are conducted by a tube $b$ on opening cocks $c\ c$. From these receptacles the juices, in order to keep up a continuous action, are alternately passed on opening cocks $d\ d$, and by means of a tube $e$, into which the cocks $d$ open, into a receptacle C, subject, however, to the control of an automatically-operating cock $f$, controlled by a float $g$ in said receptacle C. The float $g$ shuts off the supply into the receptacle C when fully or sufficiently charged with the juices, and from this receptacle C the juices are passed in properly-regulated quantities by means of a tube and graduated cock $h$ into the first one D of a series of scumming or cleaning pans D E F. These pans have their adjacent dividing walls $i\ k$ of reduced heights, the wall $i$, dividing the pans D and E, being of less height than the wall K, dividing pans E F, and the several pans are connected to discharge the one into the other in succession by rising and falling or adjustable tubes $l\ m$, operated, say, by handles $w$ and connected, respectively, the one tube $l$ with the lower portion of the pan D and the other tube $m$ with the lower portion of the pan E. The pan F is also similarly fitted with a rising and falling or adjustable tube $n$ to discharge, when raised for the purpose, contents of said pan F into an evaporating-pan G.

The evaporating-pan G has an interior series of walls $o\ o$, arranged to produce a circulating or return passage $s$, by which the juices flowing from the tube $n$ are free to circulate, first, along the one side of the pan and then back along the other side, till finally reaching a pipe or outlet $t$, from which on opening a cock $u$ in a connecting-pipe $v$ the concentrated juices are run into a receptacle H, and from thence on opening a cock $z$ discharged, as required, into a teache or pan J, and on suitably adjusting a nozzle-like revoluble tube $m'$—that is, turning its nozzle end downward instead of upward—the contents of the pan J are run into a pan or trough K, which constitutes the crystallizing pan of the apparatus. The pipe $v$ is extended and provided with an additional cock $a'$, for passing water, when required, from the evaporating-pan G, the cock $u$ then being closed. The pans D, E, and F are also provided with tubes $b'$, controlled by cocks $c'$, and connected with a pipe $d'$, for the purpose of discharging water with which said pans are cleaned or rather the impurities they may contain into a receptacle L.

M is a chute or plane onto which the dregs are scooped from the pan D and emptied into a receiver $e'$, and from thence passed by a pipe $f'$ to the receptacle L, from whence they may be taken to be used as food for cattle or as a fertilizing material.

N is the masonary foundation of the pan or teache J, including the furnace by which said pan is heated, and of which $g'$ indicates the feed-opening for the fuel, $h'$ the arch for extraction of collected ashes, and $i'$ the chimney.

R is the masonry foundation that supports the pans D E F and evaporating-pan G, and constitutes the furnace therefor, (see Figs. 1 and 2,) $a^2$ indicating the feed-opening for the fuel to said furnace; $b^2$, the grate; $c^2$, ash-pit opening; $d^2$, a wall that keeps the air entering $a^2$ from passing direct into the heating-flue $e^2$ without passing by the fire in the grate. This flue $e^2$ is a return one corresponding to the return-passage $s$ of the evaporating-pan G, beneath which it lies. The gaseous products of combustion pass through and from this flue $e^2$ to the chimney $f^2$, as indicated by arrows in Fig. 2.

$g^2$ is an arch for removing ashes from the flue $e^2$, and $h^2$ one for removing ashes from the base of the chimney $f^2$.

The operation of the apparatus is as follows: In commencing the operation the return-passage $s$ of the evaporating-pan is more or less supplied with water from any suitable source to keep the said pan from burning, and the adjustable tube $n$ set so that it will stand up to the height of the wall that separates the pans D E and the other adjustable tubes $l$ and $m$ lowered. The saccharine juices as they come from the mill are then passed into the receptacle A B, and from thence by opening the cocks $d$ and $h$ and the action of the automatic cock $f$ are run into the pan D and from it into the pan E, and from the pan E into the last pan F, until the level of the juices in the three pans D, E, and F corresponds with the level of the outlet end of the adjustable tube $n$. So soon as the juices get to the height of said tube $n$ the cocks that have been opened to admit the juices into the pans D, E, and F are closed, and fire is started in the furnace under said pans and the evaporating-pan G, placing beforehand into the pans D, E, and F the materials used for defecation. Next, in due course, the operator collects by means of a colander or large ladle the scum that ascends to the surface of the pans E and F and throws it into the receptacle L. When the juice is thus cleaned in these two pans, the cocks $d$ $d$, or one of them, according to which receptacle A or B is then charged with raw juice, are opened and the juice allowed to flow into the receptacle C. The graduating-cock $h$ is then opened, causing the float $g$, controlling the valve $f$ to fall and allowing only so much of the juice as the evaporating-pan is capable of concentrating at a time to flow first into the pan D, and from the latter in succession into the pans E and F, and thence into the evaporating-pan G, from which the water previously introduced is rapidly drawn off through the pipe $t$ on opening the cock $a'$ for the purpose. The cock $a'$ is then closed and the cock $u$ opened. By this time the juice, when it arrives at the outlet-end of the passages $s$ of the evaporating-pan will have been converted into molasses and pass off by the pipes $t$ and $v$ into the receptacle H, and is subsequently run into the teache J, and from thence in due course on turning downward the revoluble tube $m'$, delivered into the crystallizing-pan K.

With the parts arranged as described, the apparatus may be run night and day, if required, the juice being fed from the one receptacle A or B, while the other one is being charged and flowing in a continuous stream, until known or given quantities of molasses are delivered into the teache or pan J, which will give to it the necessary concentration to transform it into raw sugar, when it will be passed by the revoluble tube $m'$ into the pan K. Here the product is stirred by the action of a spatula, causing it to lose the greater part of its heat, and in due course to arrive at a proper consistency to be put in molds. During this operation the operator in attendance on the apparatus will mainly be occupied in taking the scum from the pan D that does not boil, owing to the renewal of the juice, and which enables me from time to time to remove a compact crust forming on the surface of the juice. The drawings that pass by the tube $l$, suitably adjusted for the purpose to the pan E, return to the pan D, when they commence to boil, owing to the fact that the wall dividing E and D is the lowest one of said pan E, and this is accomplished without stirring up the juice in the pan D. The dregs that pass from the pan F by the tube $m$, suitably adjusted for the purpose, pass, for the same reasons that control the passage of the dregs between D and E into the pan E, thus leaving in the pan F approximately clean juice. The operator should be careful to place in the receptacles A and B the substance used to saturate the juice or to help the defecation of the latter, to do which it will be necessary for him to open and shut alternately the cocks $d$ $d$ and $c$ $c$. By using two receptacles A and B, I am enabled to supply and keep in them the substance employed for defecating in a known quantity.

At the end of the operation when the mills no longer work, the tube $n$ that previously had occupied a raised position should be gradually lowered, so that the three pans D E F will discharge their contents leaving but a small quantity of juice in each pan. The fire should then be shut off or drawn out and the juice from the pans D and E should be transferred to the pan F by means of a ladle, replacing the juice with water that may be taken from the receptacles A or B filled with water for the purpose or be otherwise supplied. Having charged the pans D and E with water the fire should be started again, and the dregs from the pan F and those from the evaporating-pan G should be removed with the last juice, care being taken to turn or lower the tube $n$ till it reaches the bottom of the evaporating-pan, after which the tubes $l$ and $m$ should be sufficiently lowered to flood the apparatus with a quantity of water that will dislodge remaining molasses and protect the pans from damage by the fire besides cleaning the apparatus by freshening it.

This apparatus will be found very economical in fuel, having an extensive heating-surface and providing for the necessary concentration of the juice with only cane refuse for the fuel. Cheap and comparatively little labor will answer to work the apparatus, and a better quality of product is made by reason of the successive cleaning of the juices in the several pans into which the juice or juices are admitted, and the removal of the scum before passing to the evaporating-pan. The operation too is continuous, the juice entering the first cleaning-pan, flowing in a continuous stream, and so that in a few minutes it is freed from the action of the heat, which will lessen the amount of inverted sugar made as compared with apparatuses that are not continuous in their action.

Having thus described my invention, what I claim as new, and desire to secure by Letters Patent, is—

1. In an apparatus of the character described, the combination, with the furnace having an outlet and a flue leading horizontally therefrom and then returning back on itself, of the cleaning-pans directly over the furnace and having connecting-tubes, a pan G, resting on the furnace over the said flue and having a longitudinal partition $o$, forming return-channel $s$ in vertical alignment with flue $e^2$, and provided with an outlet at the end which is over the outlet end of the said flue, one of the cleaning-receptacles discharging into the passage $s$ at its end over the furnace-outlet, substantially as set forth.

2. In an apparatus of the character described, the cleaning-pans D E F, having partitions $i$ $k$ and pipes $l$ $m$ $n$, waste-pipes $b'$, having valves $c'$ and connected at their outer ends by a pipe $d'$, the receptacle L, into which pipe $d'$ discharges, the scum-chute M, and the receiver $e'$, having an outlet-pipe $f'$, also discharging into receptacle L, substantially as set forth.

RAMON FEBRES CORDERO.

Witnesses:
A. GREGORY,
EDGAR TATE.